United States Patent [19]

Bliss

[11] 4,010,693
[45] Mar. 8, 1977

[54] TRACKED AIR CUSHION VEHICLE

[75] Inventor: Denys Stanley Bliss, Cambridge, England

[73] Assignee: Bliss Pendair Limited, London, England

[22] Filed: Apr. 30, 1975

[21] Appl. No.: 573,304

[30] Foreign Application Priority Data

May 8, 1974 United Kingdom ............ 20244/74

[52] U.S. Cl. ........................ 104/23 FS; 104/134
[51] Int. Cl.² ........................................ B61B 13/08
[58] Field of Search ............... 104/23 FS, 134; 180/115, 116, 117, 118, 122, 124, 125, 126, 129

[56] References Cited

UNITED STATES PATENTS

| | | | |
|---|---|---|---|
| 3,727,715 | 4/1973 | Barthalon | 104/23 FS X |
| 3,797,398 | 3/1974 | Bliss | 104/23 FS |
| 3,827,364 | 8/1974 | Maison | 104/23 FS |
| 3,854,403 | 12/1974 | Bliss | 104/23 FS |

Primary Examiner—Robert J. Spar
Assistant Examiner—Randolph A. Reese
Attorney, Agent, or Firm—Baldwin, Wight & Brown

[57] ABSTRACT

The invention provides a tracked air cushion vehicle comprising a vehicle body, a lift platform from which the vehicle body is suspended, end bogies provided at each end of the lift platform, the lift platform and the end bogies being adapted to run within an inverted channel section track so as to define a chamber which can be maintained at subatmospheric pressure, apparatus connected to the chamber for providing the subatmospheric pressure, and biasing apparatus coupled between the vehicle body and the end bogies for biasing the end bogies towards the roof of the track, the biasing apparatus exerting a force equal to at least a substantial portion of the weight of the end bogies.

25 Claims, 10 Drawing Figures

TRACKED AIR CUSHION VEHICLE

This invention relates to tracked air cushion vehicles of a type described in U.K. Pat. No. 1,334,874 and the generally corresponding U.S. Pat. No. 3,797,398, in which a vehicle body is suspended from a lift platform extending between end bogies, the lift platform and end bogies being adapted to run within an inverted channel section track so as to define a chamber which is maintained at subatmospheric pressure with the platform supporting the weight of the vehicle and the end bogies independently located by the track walls guiding the lift platform within the track.

In such a system economic and other considerations make it desirable that the track section should be as simple as possible, and any inwardly directed flanges on the side walls of the channel should project inwardly as little as possible. Preferably such flanges are only of such extent as is necessary to provide support for the vehicle when parked or in the event that the chamber is not maintained at subatmospheric pressure to support the lift platform. Such flanges are not large enough to sustain a positive pressure air cushion which is adequate to support the weight of the end bogies, the weight of which must of course be sustained by some means.

Although this weight could be sustained from the top wall of the track by negative air pressure, such an arrangement has the disadvantage that when starting the vehicle before a negative air pressure condition is present, some means must be provided to lift the bogie from its parked position into its operative position, and a surface proximity serving device and servo system are required, or extra flanges must be provided on the track wall to retain it in its operative position.

Again, the end bogies can be sustained within the track wholly or partially by wheels bearing on the wall flanges, but such arrangements are generally only satisfactory at comparatively low speeds, and entail the application of high local stresses to the track where it is obtained by the wheels.

The invention provides a tracked air cushion vehicle comprising a vehicle body, a lift platform from which said vehicle body is suspended, end bogies provided at each end of said lift platform, said lift platform and said end bogies being adapted to run within an inverted channel section track so as to define a chamber which can be maintained at subatmospheric pressure, means connected to said chamber for providing said subatmospheric pressure, and means coupled between said vehicle body and said end bogies for biasing said end bogies towards the roof of said track, said biasing means exerting a force equal to at least a substantial portion of the weight of said end bogies.

Preferably, the weight of each end bogie is supported by the vehicle body through means continuously applying an upward force to the bogie without substantially affecting suspension movements of the body relative to the track, which force is equal to at least a substantial portion of the weight of the bogie and remains substantially constant throughout the normal range of suspension movements of the body relative to the bogie. However, the main requirement is to raise the end bogies in use to the track roof. When stopped or parked, the end bogies may be lowered or retained in a raised position; if lowered some mechanism to withdraw guidance wheels from vertical walls is desirable. Preferably the upward force exceeds the weight of the bogie.

Thus, the weight of the bogie, or at least a substantial part of it, is sustained by the vehicle body, although the bogie is still guided and located by the track, as before, and the stresses transmitted by the means guiding and locating the bogie within the track are reduced. By making the force applied greater than the weight of the bogie, there is a resultant upward force acting on the bogie at all times so that its upper surface remains adjacent the top wall of the track even when the vehicle is parked. There is therefore no necessity to provide means for raising the bogie into an operative position during starting of the vehicle.

The means coupling the end bogies to the vehicle body preferably comprise a strut fixed adjacent each end of the vehicle body, a link connected to each strut which enables the respective bogie to swivel relative to the vehicle body and a pivotal connection between each link and the respective bogie, the rotational axis of the pivotal connections defining the roll axis of the vehicle. The rotational axis of the pivotal connections can be advantageously positioned adjacent the roof of the track so that it is above the lift platform edge seals. With the latter construction, a restoring rolling moment is automatically induced when the vehicle is displaced laterally by a side wind. The same action when cornering tends to offset a lateral movement of the center of lift in the opposite direction due to the curvature of the lift platform. Moreover, the vertical distance between the rotational axis of the pivotal connections and edge seals can be regulated to control roll of the vehicle. Such regulations may be effected when the means for providing said subatmospheric pressure comprises a fan in a duct extending between said chamber and the atmosphere, said duct or a bypass duct containing an adjustable throttle valve for varying said subatmospheric pressure, and in which means are provided which are responsive to relative movement of said platform and at least one of the end bogies for controlling the position of said throttle valve. The relative movement between said platform and one of the end bogies can be transmitted via a cable drive to a spring loaded lever controlling the position of the throttle valve; the cable being adjustable at its connection to the lift platform in response to a signal from a lateral accelerometer.

The invention is described further with reference to the accompanying diagrammatic drawings in which.

Figure 1:
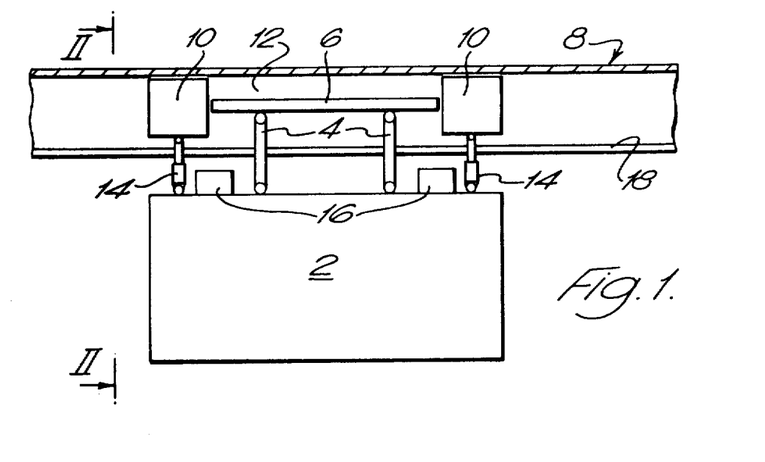
FIG. 1 shows a side elevation of a vehicle in accordance with the invention, operating in a length of inverted channel section track shown in vertical longitudinal cross section.
Figure 2:
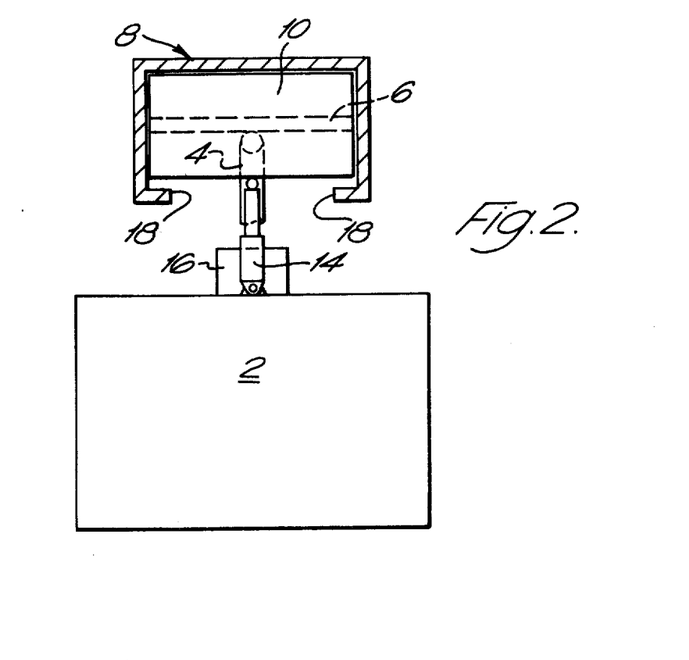
FIG. 2 shows, on an enlarged scale, an end elevation of the vehicle, the track being shown in transverse vertical cross section through lines II — II.

The vehicle comprises a body 2, usually but not necessarily adapted for the carriage of passengers, supported by hangers 4 from a lift platform 6 which is guided for movement within an inverted channel section track 8 by end bogies 10. The connection (not shown) between the end bogies 10 and the vehicle body 2 is such as to enable the platform 6 to make any desired suspension movement relative to the track and the bogies, which are guided and located by interaction with the track so as to follow the latter. The lift platform and the end bogies cooperate with the track so as to enclose a chamber 12 which can be maintained at subatmospheric pressure to sustain the lift platform and the body at a desired height relative to the track, movement of the platform relative to the bogies being utilized to control the pressure within the chamber. Further details of the construction of the lift platform and end bogies are described in U.K. Pat. No. 1,334,874 and the generally corresponding U.S. Pat. No. 3,797,398.

The end bogies may be guided and located within the track by wheels acting on the walls of the track, but preferably in a vehicle in accordance with the present invention positive pressure air cushions are utilised, acting on both side and the top walls of the track. This arrangement causes a resultant downward force to act on the bogies in addition to their own weight, and this force and the weight of the bogies is sustained by telescopic struts 14 acting between the bogies 10 and the body 2. These struts each comprise a hydraulic piston and cylinder device connected to an accumulator 16 and a motor driven pump which acts to maintain a substantially constant or only slightly varying pressure within the cylinder regardless of the degree of extension of the strut. The pressure is selected so that the bogie is supported at all times and urged towards the top wall of the track against the downward pressure exerted by the air cushion acting against that wall.

The pressure and accumulator capacity may be selected so that the bogie is supported at all times and urged towards the top wall of the track against the downward pressure exerted by the air cushion or wheels acting against that surface, even when the vehicle is parked with the lift platform resting on flanges 18, or with the bottom of the vehicle resting on a surface a suitable distance beneath the track. If the vehicle is parked by allowing the end bogies to rest on the track flanges 18 (when the bogie must move away from the upper track wall), it is advisable to retract any wheels used for guiding the end bogie from the vertical track walls. No retraction mechanism will be needed if air cushions are used for guidance with respect to the vertical track walls. The struts 14 could be loaded by springs instead of hydraulically, but it is difficult with springs to apply a sufficiently constant pressure to the bogies over the range of movement normally required.

Figure 3:
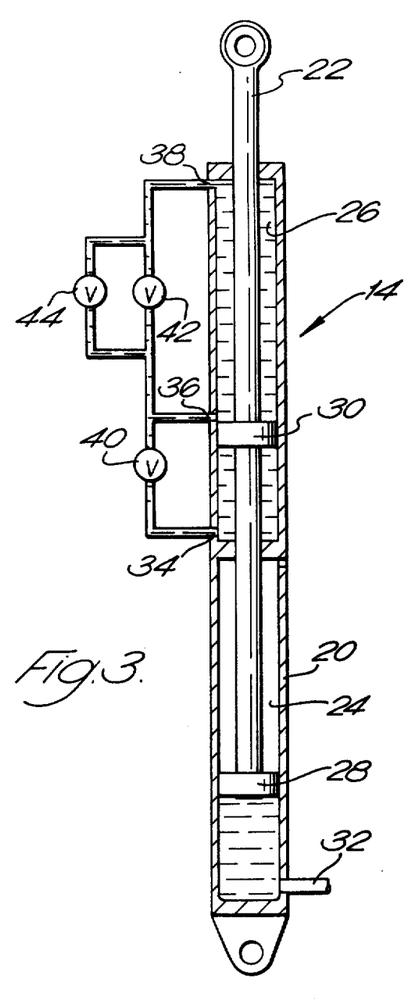
FIG. 3 shows one manner of connection between struts joining the body of the vehicle to an end bogie.

FIG. 3 shows one suitable form of hydraulically operated strut 14. The strut comprises a body 20 pivotally connected at its lower end to the roof of the body 2, and a piston rod 22 pivotally connected to the bogie 10 at its upper end, the pivotal axes being parallel to the length of the vehicle to enable the vehicle body 2 to make any required suspension movements relative to the body without obstruction. The body 20 defines two cylinders 24 and 26 arranged in tandem, and the piston rod 22 carries two pistons 28 and 30. The space in the cylinder 24 below the piston 28 is connected by a pipe 32 to the accumulator 16, the space above the piston being vented to the atmosphere. With a suitably designed accumulator, a relatively constant upward pressure is maintained on the piston 28 regardless of its position in the cylinder; this pressure is selected so as to be somewhat greater than the weight of the end bogie.

The cylinder 26 is provided with three vertically spaced ports 34, 36 and 38, the ports 34 and 36 being externally connected via a valve 40, and the ports 36 and 38 being externally connected via valves 42 and 44. The ports 34 and 36 are located so that the piston 30 lies between them during normal operation of the vehicle, and the valve 40 may either be maintained wide open so as to allow free displacement of liquid from one side of the piston 30 to the other, or used as a choke to provide damping of vertical and pitching movements of the vehicle body. The valve 42 is normally open, and provides a moderate degree of choking of liquid displacement when the vehicle body is moving into or out of a parking position below its normal range of suspension movement, as is required for example when the vehicle stops at a station. The rate of descent into this parking position required during normal operation may be excessive in the event of a failure resulting in the chamber 12 being depressurised while the vehicle is in motion and provision may be made that the valve 42 should close in the event of such a failure so that the rate of descent is controlled by the more heavily choked valve 44.

Instead of the serially connected cylinders shown in FIG. 3, a pair of parallel-connected cylinders could be employed. In this case, cylinder 24 is located alongside cylinder 26 and the connecting rods of pistons 28 and 30 are laterally coupled. This arrangement has the advantage of greater vertical compactness.

Figure 4A:
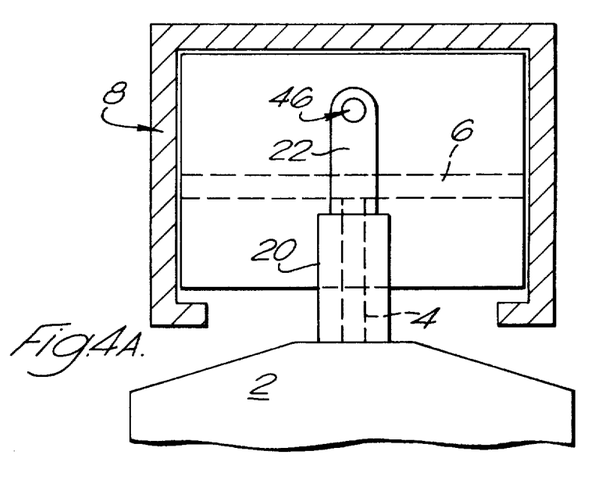
FIGS. 4A and 4B show an alternative embodiment where the upper pivot center of the struts, in line with the longitudinal axis of the vehicle body, defines the roll axis of the vehicle body and lift platform assembly.
Figure 4B:
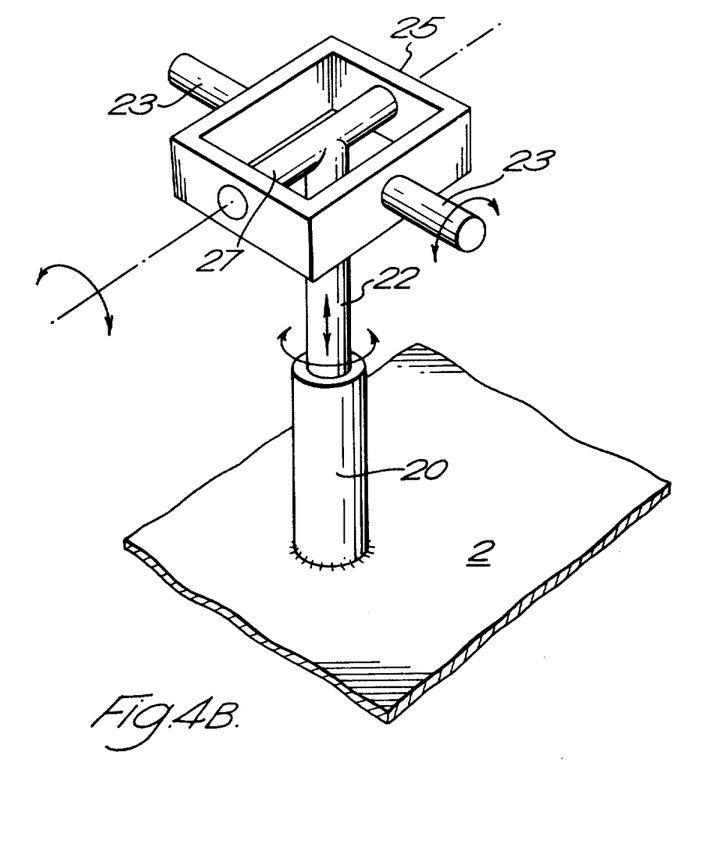

Referring to FIGS. 4A and 4B, the means coupling each end of the vehicle body 2 to the respective end bogie can include a strut body 20 (only one is shown) rigidly connected to the vehicle body and links 22 (only one is shown) which are connected to pivotal connections having a rotational axis 46 which is coincident with the roll axis of the vehicle. Referring to FIG. 4B, transverse shafts 23 are supported in bearings (not shown) in the respective end bogie (not shown) to accomodate pitching movement. Each shaft 23 is fixed to a frame 25 which pivotally supports a shaft 27 on axis 46. Shaft 27 is located with its longitudinal axis coincident with the roll axis of the vehicle to accomodate rolling movement. Strut 22 can swivel in strut body 20 to accomodate yawing movement. Pitch allows for track vertical curvature and yaw allows for track horizontal curvature, both movements being very small. A ball and socket joint (not shown) may be used instead of the arrangement shown in FIG. 4B. Lateral movement of the body 2, when the platform 6 is not at its normal height, can be accomodated by minor lateral movement of the platform edges.

Figure 5:
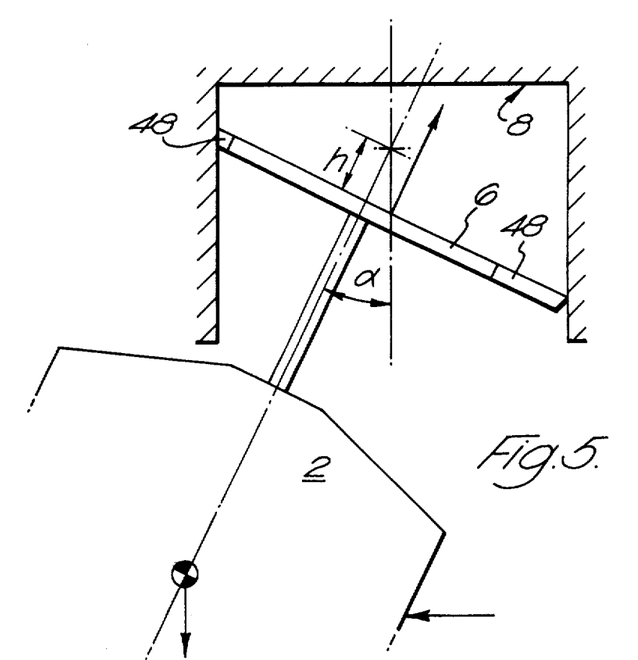
FIG. 5 is a schematic view illustrating the forces acting in the embodiment of FIG. 4 during roll, induced by wind on straight track.
Figure 6:
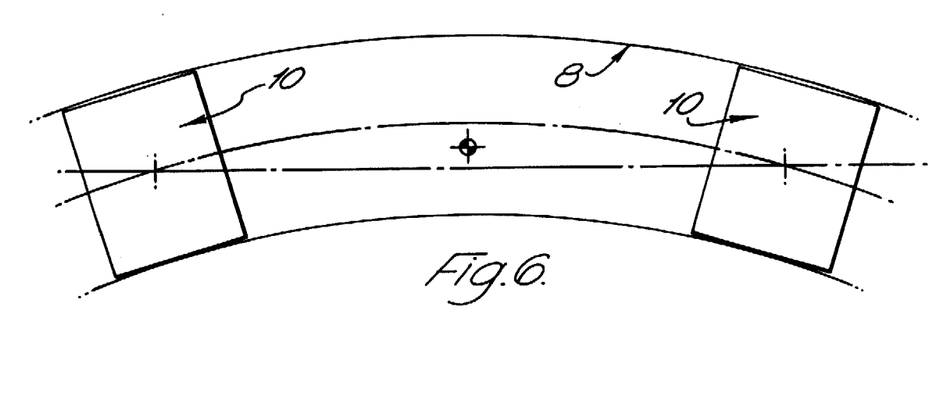
FIG. 6 is a plan view of the vehicle used in the embodiment of FIG. 4 when operating on curved track.

The rotational axis 46 of the pivotal connections of shaft 27 can be advantageously positioned near the roof of the track so that it is above the lift platform edge seals 48 as shown in FIG. 5. With this configuration, a restoring rolling moment with an arm h tan $\alpha$ is automatically induced when the vehicle is displaced laterally by a side wind or when cornering. In the latter case, this offsets a lateral movement of the center of lift in the opposite direction due to curvature of the lift platform as illustrated in FIG. 6. The center of lift moves to the outside of the curve due to the change of lift platform shape, the movement being proportional to the reciprocal of the track radius.

A further possibility is that by regulating the vertical distance between the rolling axis and the edge seals a measure of roll control can be obtained. This may be achieved in an arrangement wherein the chamber which is normally maintained at subatmospheric pressure is connected to a duct extending to the atmosphere, a fan being provided in the duct for maintaining a sustaining pressure within said chamber and an adjustable throttle valve being provided either in the duct, or a by-pass duct connected thereto, to reduce the effective cross section of the duct to enable the pressure within the chamber to be varied without directly altering the air-flow therethrough and thus avoiding undesirable interaction with the operation of the edge seals. Such an arrangement is described with reference to FIGS. 7 and 8.

Figure 7:
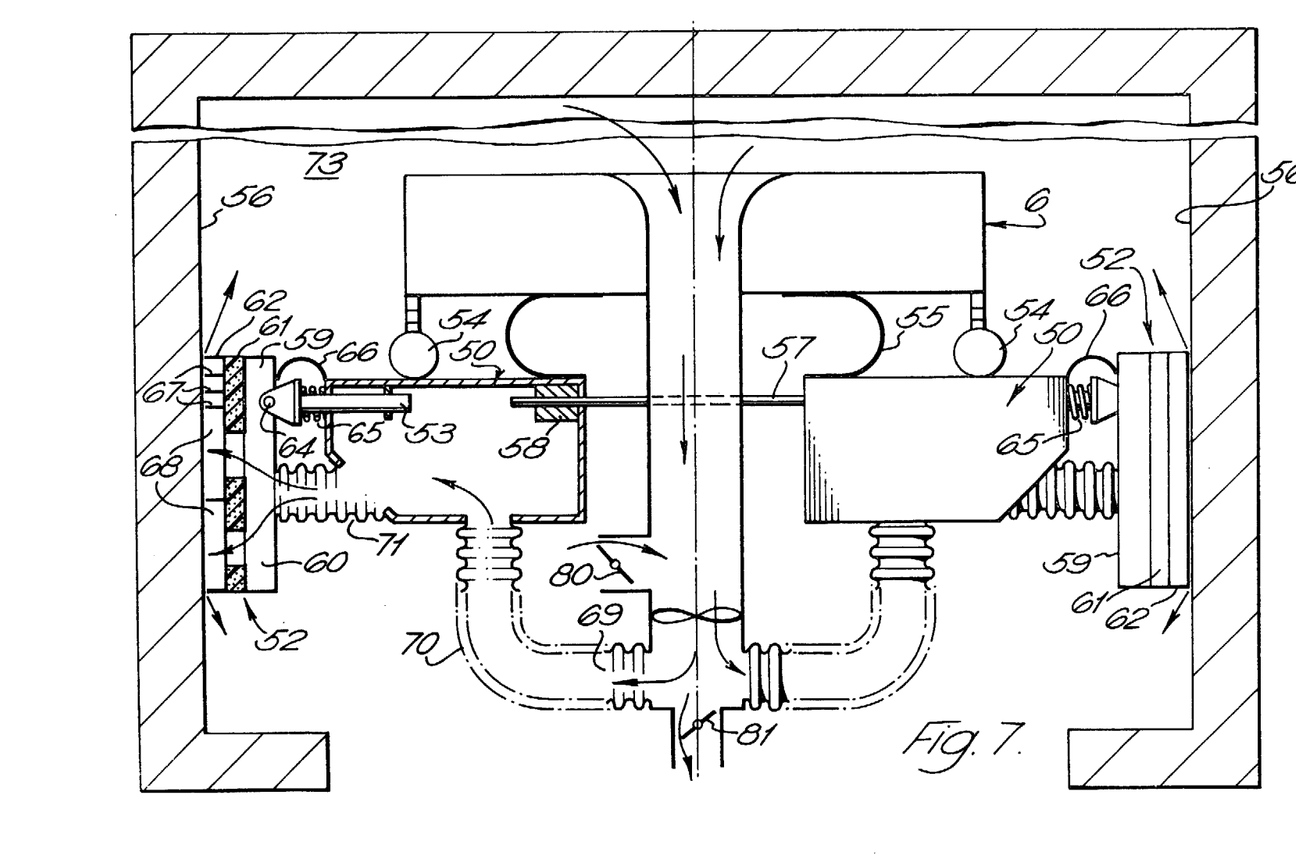
FIG. 7 is a diagrammatic cross-section of a further embodiment showing edge seals and a dual throttle valve arrangement.

FIG. 7 shows a lift platform 6 which has movable edge section 50 each carrying a skirt assembly 52. Edge sections 50 roll on rollers 54 and are sealed to lift platform by seal 55 which also provides a force on sections 50 closing them to track walls 56. Edge section 50 are interconnected by shaft 57 in linear bearings 58 allowing lateral movement of sections 50 and supporting moments due to pressure forces when sections 50 are displaced. Each skirt assembly 52 consists of a stiff skirt base 59 forming a plenum chamber 60, a resilient layer 61 and replaceable facing strip 62. Strip assembly 52 is mounted on its edge section 50 by a spring loaded rod 53 which allows pivoting of the skirt assembly 52 at a pivot 64 when the lift platform tilts in the track. Springs 65 take up initial movement of the skirt assembly 52 due, for example, to track irregularities and are a form of secondary suspension for the skirt. Larger movements are absorbed by the edge sections 50. Edge sections 50 move to form an approximation to the curved wall of track as shown in FIG. 14 of U.K. Patent Application Ser. No. 30954/72. The Priority Application for U.S. Pat. No. 3,854,403; the disclosure of which is incorporated herein by cross-reference. The skirt assembly is sealed to edge sections 50 by seal 66.

Figure 8:
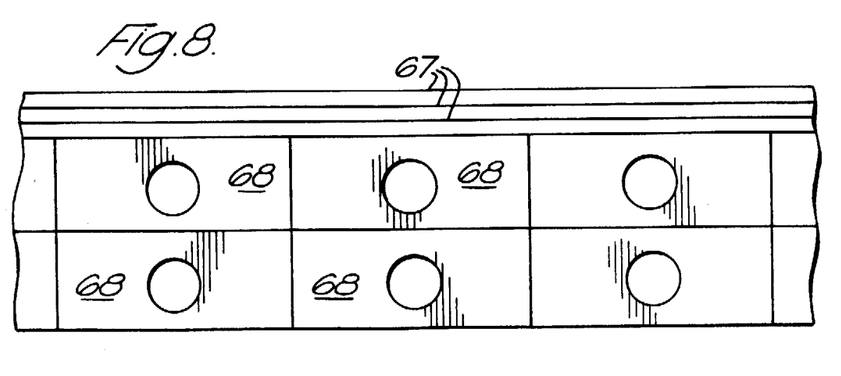
FIG. 8 shows a replaceable facing strip used in the embodiment of FIG. 7.

Replaceable strip 62, shown in side elevation in FIG. 8, consists of labyrinth seal lips 67 and a number of positive pressure air cushion cells 68. Air is fed from a fan exit 69 via flexible pipes 70 and 71 and the edge section 50 structure (which forms a distribution duct) to plenum chamber 60, and hence to cells 68. The air cushions thus formed in cells 68 provide an air bearing against the track wall for the whole assembly and provide an opposite force to that from seal 55. The purpose of labyrinth 67 is to reduce the air flow into the suction chamber 73.

The function of resilient layer 61 is to allow slight curvature of strip 62 to take up the small difference in gap between a curved track wall and stiff member 60 (as shown in FIG. 14 of U.K. Patent Application No. 30954/72 the Priority Application for U.S. Pat. No. 3,854,403).

An adjustable control valve 80 may be mounted in the duct system upstream of the fan exits 69 for controlling incoming air or an adjustable control valve 81 may be mounted downstream of the exits 69.

Figure 9:
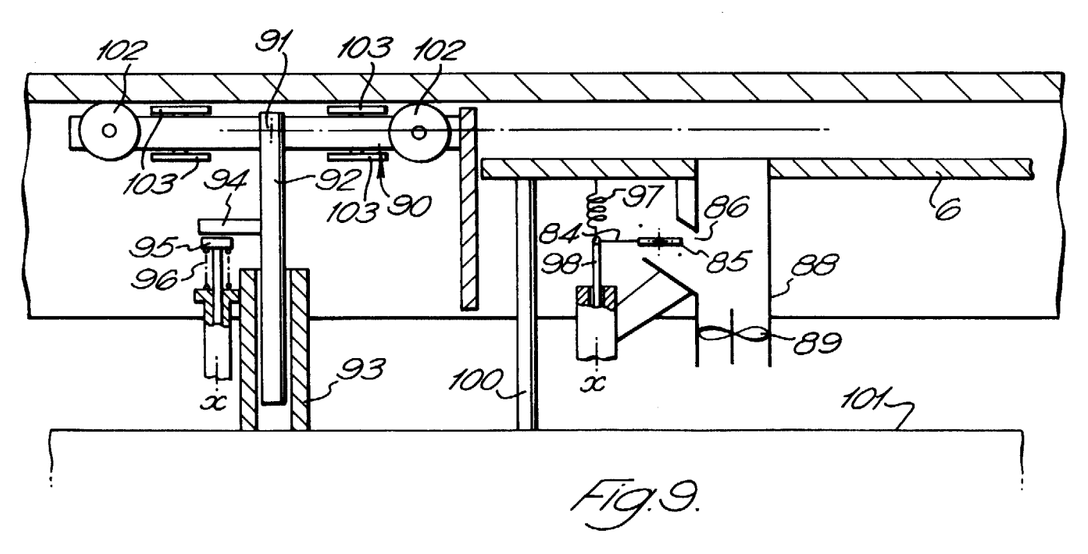
FIG. 9 is a diagram illustrating control means for use in connection with the embodiment of FIG. 7.

FIG. 9 illustrates diagramatically one form of control for a throttle valve 85 in a by-pass duct 86 connected to the main suction duct by means of which subatmospheric pressure is applied to the chamber above the platform 6 by a fan 89. This valve 85 is provided so as to enable the lift platform 6, should it stray during operation above a normal operating position in the track, to be moved back automatically to its normal position. Opening of the valve 85 will decrease the suction producing effect of the fan 89 and vice-versa. The valve 85 is operated automatically due to relative movement between the lift platform 6 and one of the end bogies 90 under the control of a cable drive between points x—x associated with the platform and bogie.

As can be seen from FIG. 9, the end bogie 90 has a pair of wheels 102 and two sets of four wheels 103 for engaging the top and sides of the track respectively. The bogie is coupled by a coupling 91 to a strut 92 which is telescopically received in a cylinder 92 connected to roof 101 of the vehicle, which is supported from the lift platform 6 by strut 100. The coupling 91 is such as to allow at least roll of the vehicle body and pitch of the end bogie 90 relative to the lift platform 6. It may also allow yaw of the end bogie if it constitutes a ball and socket connection.

An abutment 94, fixed to strut 92, engages one end of a push rod 95. Push rod 95 is biased by a compression spring 96 and has its lower end connected to one end of the cable drive between points x—x associated respectively with the bogie 90 and platform 6. A push rod 98 is connected to the other end of the cable drive between points x—x and to one end of a lever 84 connected to the valve 85. The lever 84 is also connected to a tension spring 97 which is fixed to the lift platform 6. Compression spring 96 is stronger than tension spring 97 so that when the vehicle is in a parked position the springs 96 will close the throttle valve 85. As the vehicle rises to an operative position the push rod 95 will engage abutment 94 so that further upward movement of the vehicle causes the throttle valve to open. Obviously, therefore, if during passage of the vehicle along the track it moves above its normal operating position, valve 85 will tend to open, thereby causing a reduction in the subatmospheric pressure in the chamber above platform 6. Likewise, if the vehicle moves below its normal operating position, valve 85 will be biased towards a closed position tending to increase the subatmospheric pressure above the platform to bring the platform back to its normal operating position. It will be appreciated that the operating height of the vehicle can be regulated by changing the normal relative positions of the rod 95 and abutment 94, e.g. by a rack and pinion device.

The rate of change of air admission through the by-pass duct 86 due to change of height of the platform 6 may be adjusted by altering the length of the lever 84. Hence, it is a simple matter to control the suspension characteristics of the vehicle because an increase in the length of the lever will require a greater platform movement for a given change in the opening of the throttle valve.

Regulation of the vertical distance between the rolling axis and the edge seals can be effected by adjusting the cable at its connection to platform 6 either manually or in response to a signal from a lateral accelerometer.

What we claim is:

1. A tracked air cushion vehicle comprising a vehicle body, a lift platform from which said vehicle body is suspended, end bogies provided at opposite ends of said lift platform, said lift platform and said end bogies being adapted to run within an inverted channel section track having a roof so as to define a chamber which can be maintained at subatmospheric pressure, means connected to said chamber for providing said subatmospheric pressure, and means coupled between said vehicle body and said end bogies for biasing said end bogies towards the roof of said track, said biasing means exerting a force equal to at least a substantial portion of the weight of said end bogies, said means coupled between said vehicle body and said end bogies comprising a plurality of struts, and a link connected to each strut which enables the respective bogie to swivel relative to the platform and a pivotal connection between each link and the respective bogie.

2. A vehicle according to claim 1 wherein the rotational axis of the pivotal connections define the roll axis of the vehicle.

3. A tracked air cushion vehicle comprising a vehicle body, a lift platform from which said vehicle body is suspended, end bogies provided at opposite ends of said lift platform, said lift platform and said end bogies being adapted to run within an inverted channel section track having a roof so as to define a chamber which can be maintained at subatmospheric pressure, means connected to said chamber for providing said subatmospheric pressure, and means coupled between said vehicle body and said end bogies for biasing said end bogies towards the roof of said track, said biasing means exerting a force equal to at least a substantial portion of the weight of said end bogies, said means for providing said subatmospheric pressure comprising a fan in a duct extending between said chamber and the atmosphere, said duct containing an adjustable throttle valve for varying said subatmospheric pressure and including means responsive to relative movement of said platform and at least one of said end bogies for controlling the position of said throttle valve.

4. A vehicle according to claim 3 wherein said relative movement between said platform and said one end bogie is transmitted via a cable drive to a spring loaded lever controlling the position of the throttle valve, said cable being adjustible at its connection to said one bogie in response to a signal from a lateral accelerometer.

5. A tracked air cushion vehicle comprising a vehicle body, a lift platform from which said vehicle body is suspended, end bogies provided at opposite ends of said lift platform, said lift platform and said end bogies being adapted to run within an inverted channel section track having a roof so as to define a chamber which can be maintained at subatmospheric pressure, means connected to said chamber for providing said subatmospheric pressure, and means coupled between said vehicle body and said end bogies for biasing said end bogies towards the roof of said track, said biasing means exerting a force equal to at least a substantial portion of the weight of said end bogies, said means coupled between said vehicle body and said end bogies comprising, at each end of the vehicle body, an hydraulically operated member, each of said members including a pair of interconnected cylinders and pistons, the cylinders of each member being connected through ports to a valve arrangement and an accumulator at least to enable liquid displacement to be choked between said cylinders to damp the motion of the vehicle in use.

6. A tracked air cushion vehicle comprising a vehicle body; a lift platform from which said vehicle body is suspended; end bogies provided at each end of said lift platform, said lift platform and said end bogies being adapted to run within an inverted channel section track including side and top walls so as to define a chamber which can be maintained at subatmospheric pressure; means connected to said chamber for providing said subatmospheric pressure; respective strut means coupled between each of said end bogies and said vehicle body, each of said strut means including means for biasing said end bogies towards the top wall of said track with a force equal to at least a substantial portion of the weight of the respective end bogie; link means which enable the respective bogie to swivel relative to the platform; pivotal means connected between each link means and the respective bogie, the rotational axis of the pivotal means defining the roll axis of the vehicle; and means responsive to vertical movement of said platform relative to said track for regulating said subatmospheric pressure.

7. A vehicle according to claim 6 in which said biasing means include means continuously applying an upward force to the bogie without substantially affecting suspension movements of the body relative to the track.

8. A vehicle according to claim 6 wherein said force exerted by the biasing means exceeds the weight of the respective bogie.

9. A vehicle according to claim 6 wherein the rotational axis of the pivotal connections is adapted to be positioned adjacent the roof of the track so that it is, in use, above edge seals coupled to the lift platform.

10. A vehicle according to claim 9 wherein the vertical distance between said rotational axis of said pivotal connections and said edge seals is regulated by said means responsive to the vertical movement of said vehicle relative to said track.

11. A vehicle according to claim 6 wherein the means for providing said subatmospheric pressure comprises a fan in a duct extending between said chamber and the atmosphere, said duct containing an adjustable throttle valve for varying said subatmospheric pressure, said throttle valve being controlled by said means responsive to the vertical movement of said vehicle relative to said track.

12. A vehicle according to claim 6 wherein the means for providing a subatmospheric pressure comprises a fan in a main duct extending between said chamber and the atmosphere and a bypass duct connected between said main duct and the atmosphere, said bypass duct containing an adjustable throttle valve for varying said subatmospheric pressure, said throttle valve being controlled by said means responsive to the vertical movement of said vehicle relative to said track.

13. A vehicle according to claim 6 wherein said means responsive to vertical movement of said vehicle relative to said track comprises, throttle valve means located in a duct, said duct communicating between a fan for providing said subatmospheric pressure and the atmosphere; means coupled between at least one of said end bogies and said platform to derive an output dependent on the relative movement therebetween;

and means coupling said output to said throttle valve means.

14. A vehicle according to claim 13 wherein said means coupling said output to said throttle valve means comprises a cable drive to a spring loaded lever controlling the position of said throttle valve means, and wherein said means coupled between at least one of said end bogies and said platform comprises a lateral accelerometer.

15. A vehicle according to claim 14 including means for providing positive pressure air cushions to act on both the side and top walls of said track whereby a resultant downward force acts on the bogies in addition to their own weight.

16. A vehicle according to claim 15 in which said strut means comprises, at each end of the vehicle body, an hydraulically operated member, each of said members including a pair of interconnected cylinders and pistons, the cylinders of each member being connected through ports to a valve arrangement and an accumulator at least to enable liquid displacement to be choked between said cylinders to damp the motion of the vehicle in use.

17. A tracked air cushion vehicle comprising a vehicle body, a lift platform from which said vehicle body is suspended, end bogies provided at opposite ends of said lift platform, said lift platform and said end bogies being adapted to run within an inverted channel section track having a roof so as to define a chamber which can be maintained at subatmospheric pressure, means connected to said chamber for providing said subatmospheric pressure, and means coupled between said vehicle body and said end bogies for biasing said end bogies towards the roof of said track, said biasing means exerting a force equal to at least a substantial portion of the weight of said end bogies, said means for providing said subatmospheric pressure comprising a fan in a duct extending between said chamber and the atmosphere, and a bypass duct containing an adjustable throttle valve for varying said subatmospheric pressure and including means responsive to relative movement of said platform and at least one of said end bogies for controlling the position of said throttle valve.

18. A vehicle according to claim 17 wherein said relative movement between said platform and said one end bogie is transmitted via a cable drive to a spring loaded lever controlling the position of the throttle valve, said cable being adjustable at its connection to said end bogie in response to a signal from a lateral accelerometer.

19. An air cushion vehicle comprising a lift platform, a fan, wall means carried by said lift platform for cooperating with a track to enclose at least one air cushion, said lift platform being supportable by said air cushion, duct means carried by said lift platform providing communication between said air cushion, said fan and the atmosphere, throttle valve means for cooperation with said duct means to enable the pressure within said air cushion to be varied, means carried by said lift platform for sensing said track, means for maintaining said track sensing means adjacent said track, and means responsive to relative movement between said track sensing means and said lift platform, including direct linkage means connected between said track sensing means and said throttle valve means to control said throttle valve means for maintaining said lift platform at a predetermined distance from said track.

20. A vehicle according to claim 19 wherein said duct means includes a duct extending between said wall means and the atmosphere, the fan being provided in said duct.

21. A vehicle according to claim 20 wherein said fan acts to provide a negative air pressure cushion relative to the atmoshpere, and said throttle valve means includes a throttle valve in said duct downstream of said fan.

22. A vehicle according to claim 19 wherein said duct means includes a first duct extending between said wall means and the atmosphere and a second duct extending between said first duct and the atmosphere, said fan acting to provide a negative air pressure cushion relative to atmosphere, and said throttle valve means including a throttle valve being provided in the second duct.

23. A vehicle according to claim 19 including a body, said lift platform being suspended from said body, end bogies provided at each end of said lift platform, said lift platform and said end bogies being constructed to run within an inverted channel section track so as to enclose said cushion, said means responsive to said relative movement being responsive to the relative movement between said lift platform and at least one of said end bogies for controlling the position of said throttle valve means.

24. A vehicle according to claim 23 wherein said relative movement between said platform and said end bogie is transmitted by said direct linkage which is in the form of a cable drive to a spring loaded lever which controls the position of said throttle valve means.

25. An air cushion vehicle comprising a body, a lift platform from which said body is suspended, an end bogie at each end of said lift platform, said lift platform and said end bogies being constructed to run within an inverted channel section track so as to define with such track a chamber, a fan for providing a reduced air pressure in such chamber to support said lift platform, duct means for communicating between said fan and the atmosphere, throttle valve means located in said duct means for varying the pressure within said chamber, control means responsive to relative movement between said platform and at least one of said end bogies for controlling the position of said throttle valve means, and mechanical linkage means coupled directly between said throttle valve means and said control means.

* * * * *